（12）United States Patent
Karsten et al.

(10) Patent No.: US 6,948,363 B1
(45) Date of Patent: Sep. 27, 2005

(54) DISC METERING ASSEMBLY FOR RESISTING ROTATIONAL FORCES

(75) Inventors: Lee Karsten, Fox Point, WI (US); George De Jarlais, Wauwatosa, WI (US); Ronald D. Benson, Colgate, WI (US)

(73) Assignee: Badger Meter, Inc., Milwaukee, WI (US)

( * ) Notice: Subject to any disclaimer, the term of this patent is extended or adjusted under 35 U.S.C. 154(b) by 0 days.

(21) Appl. No.: 10/831,817

(22) Filed: Apr. 26, 2004

(51) Int. Cl.[7] ............................................. G01F 3/32
(52) U.S. Cl. .......................................... 73/238; 73/258
(58) Field of Search .......................... 73/236, 237, 238, 73/239, 253, 258

(56) References Cited

U.S. PATENT DOCUMENTS 715,564 A * 12/1902 Dupoy ........................ 73/238
3,289,476 A * 12/1966 Brette ......................... 73/258

* cited by examiner

Primary Examiner—Harshad Patel
(74) Attorney, Agent, or Firm—Quarles & Brady LLP

(57) ABSTRACT

A fluid meter (10) has a casing (11) providing a measuring chamber (27) and an inlet (18) and outlet (19) communicating with the measuring chamber (27). A partition (20) in the chamber (27) separating said inlet (18) from said outlet (19). A disc (28, 48) is positioned in the chamber (27) and includes projections (36) or niches (57) which are disposed in an arc relative to a center of the disc (28, 48) and the casing is provided with integrally formed depressions (37) or with projections (56) disposed opposite the projections (36) or niches (57) on the disc (28) to be engaged the disc (28) as the disc (28, 48) is nutated with the result of counteracting forces imposed on said disc (28, 48) by fluid flow.

8 Claims, 5 Drawing Sheets

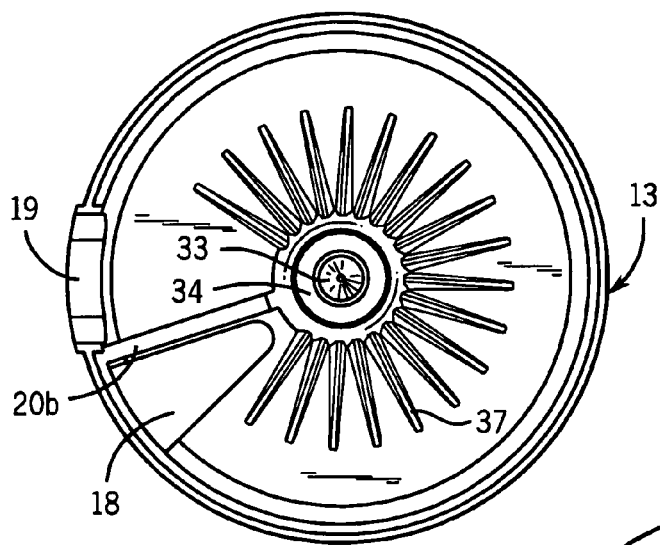
FIG. 4
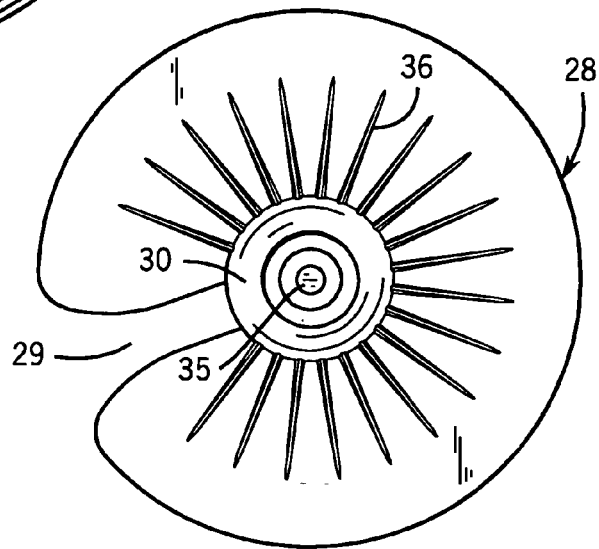
FIG. 5
FIG. 6
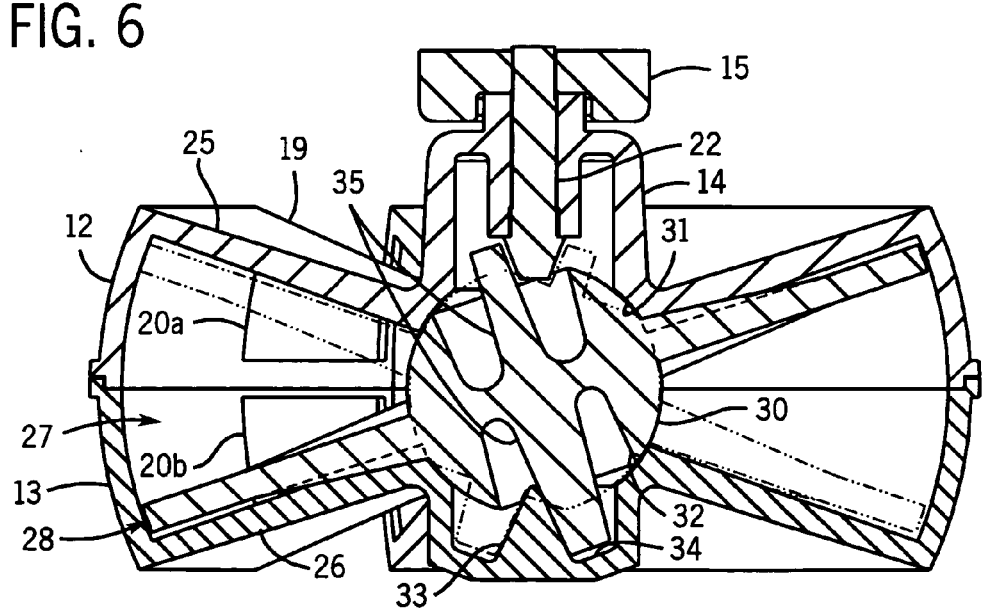

DISC METERING ASSEMBLY FOR RESISTING ROTATIONAL FORCES

TECHNICAL FIELD

This invention relates to fluid meters and in particular to improvements in meters utilizing a nutating disc for measuring the flow of fluid through the metering chamber.

DESCRIPTION OF THE BACKGROUND ART

Certain well known fluid meters, including water meters, utilize a nutating disc metering element to measure the flow of fluid through a metering chamber. The fluid passing through the metering chamber imparts a nutating (wobbly) motion to the disc which is converted to a rotary motion or other motion to actuate a counter or register for the meter. The pressure and velocity of fluid entering the metering chamber provides considerable force on the nutating disc, and this force is transmitted to the measuring chamber housing where contact between the two elements occurs. The forces imparted by the fluid must be counteracted to insure the accuracy and the proper functioning of the meter.

For many years, a thrust roller mechanism has been used to counter such forces. This mechanism is disclosed in Miller, U.S. Pat. No. 1,957,661, which was assigned to the assignee of this invention, and a good depiction is illustrated in Thomson, U.S. Pat. No. 10,022, FIG. 17. A thrust roller is attached to the disc diametrically opposite the inlet of the measuring chamber, where the thrust roller rolls up and down in a slot in the meter casing. Such slots utilize various types of bearing inserts which are placed in proximity to the roller to minimize wear and reduce friction, which would impede proper nutation of the disc. These inserts are replaceable and are of common use in nutating disc type metering devices which are used by many municipalities for metering water used by subscribers. Such thrust rollers and inserts tend to wear over time and present certain problems in manufacture, assembly and servicing of the meter.

SUMMARY OF THE INVENTION

The invention provides a nutating disc meter with a construction that will resist forces imparted on the disc by the fluid without using the conventional thrust bearing found in many nutating disc meters.

The invention provides a bearing for a nutating disc which provides reliable performance, is simple to replace, and which eliminates the moving parts required with conventional thrust rollers currently used in nutating disc chambers.

The invention is provided in a metering assembly having a nutating disc disposed in a chamber. The disc is formed with either projections or depressions that engage the complementary one of these which are formed on the casing as the disc is nutated. The depressions and projections can be integrally formed on the disc and chamber parts to eliminate moving parts provided by the thrust roller bearing of the prior art.

The projections engage the depressions as the disc is nutated to counteract rotational forces imposed on said disc by fluid flow.

The invention eliminates the conventional thrust roller which cooperates with a vertically extending slot in the disc chamber. The invention also counteracts the forces normally absorbed by the thrust roller and helps absorb the force against the disc as the disc straddles the usual partition associated with a metering chamber.

The invention also provides additional detailed teachings in the manner of shaping and locating the projections and depressions.

The invention provides a disc meter that has a lower cost of manufacture than prior art constructions.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

BRIEF DESCRIPTION OF THE DRAWINGS

FIG. 4 is a top plan view of a bottom casing part of the assembly of FIGS. 1 and 2;

FIG. 5 is a top plan view of a nutating disc in the assembly of FIGS. 1–3;

FIG. 6 is an enlarged sectional view taken in the plane indicated by line 6—6 in FIG. 2;

DETAILED DESCRIPTION OF THE PREFERRED EMBODIMENTS

Figure 1:
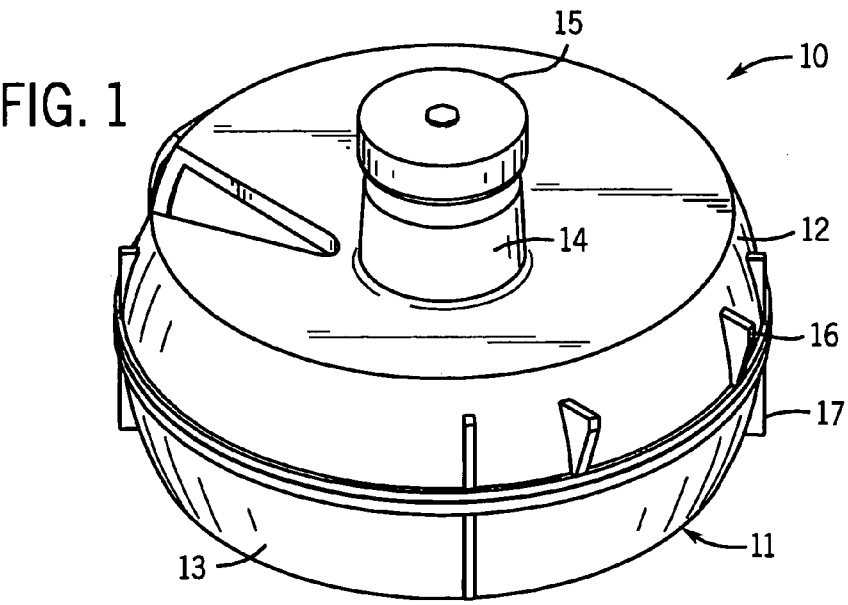
FIG. 1 is a perspective view of a metering assembly that incorporates the present invention.

Referring to FIG. 1, a fluid metering assembly 10 has a generally cylindrical casing 11 with an upper casing part 12 and a lower casing part 13. The upper casing part forms a hub 14 and seen on top of the hub 14 is a rotatable, magnetic element 15, which may have 2*n magnetic poles, where n is a variable integer such as "1" or "2." This magnetic element 15 rotates at least a part of one revolution up to one revolution for each unit of consumption. A magnetic pickup (not shown) is used to detect these rotations which counted by a meter counter or register (not shown) of a type well known in the art.

The casing parts 12, 13 have molded projections 16, 17 for situating the casing 11 inside of an external metal meter housing (not shown) of a type well known in the art. The housing could also be made of plastic. This external meter housing would also include threaded spouts for attaching the assembly a fluid supply line.

Figure 2:
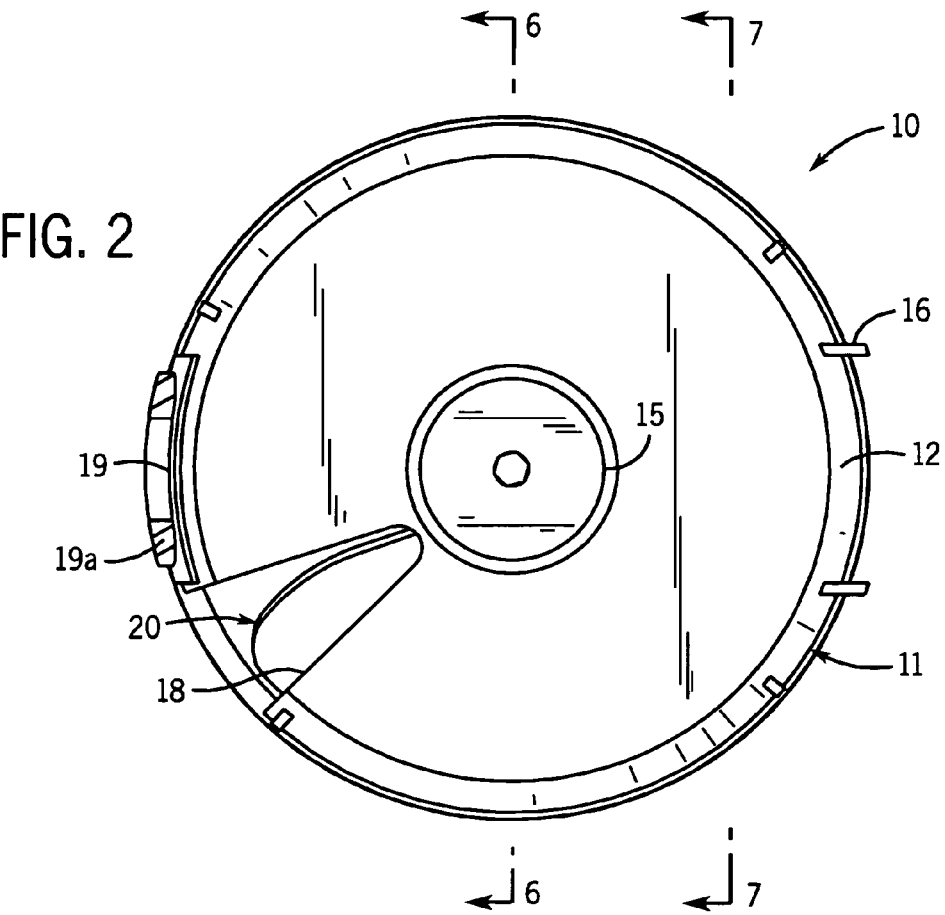
FIG. 2 is a top plan view of the assembly of FIG. 1.

As seen in FIGS. 1 and 2, the fluid metering assembly 10 has an inlet 18, an outlet 19 and a partition 20 for separating the two parts of the flow stream in an interior of the casing 12. The outlet 19 would typically have a seal (not shown) disposed on an outlet port formed 19a to isolate the outlet flow from the inlet 18. The inlet 18 would typically have a screen (not shown) across its opening to prevent foreign particles from entering a chamber 27 (FIG. 6) in the casing 12.

Figure 3:
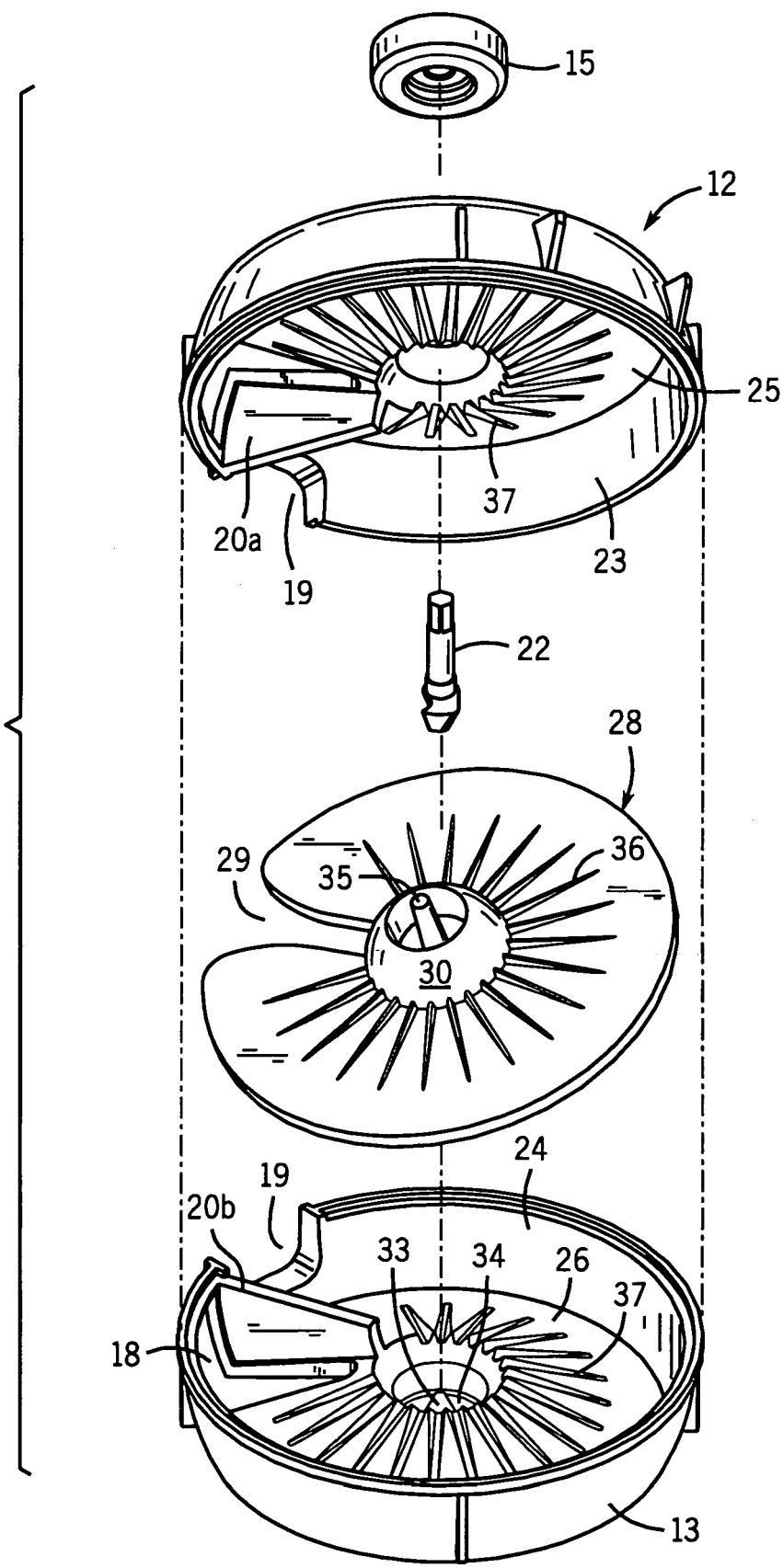
FIG. 3 is an exploded perspective view of the assembly of FIG. 1.

Referring to FIG. 3, further details of these parts are illustrated. It can be seen that the magnetic element 15 is annular in shape with a central web that forms a hole for receiving an upper end and head of a shaft of a crossbar unit 22. It can also be seen that the partition 20 is formed by a half section 20a on the upper casing part 12 and by a half section 20b on the lower casing part 13. The outlet 19 is completely formed in the side walls of the casing parts 12, 13, while the inlet 18 is formed in both the side walls 23, 24 and the upper and lower concave walls 25, 26.

The casing parts 12, 13 form a chamber 27 (FIG. 6) in which a disc element 28 is assembled. As seen in FIGS. 3, 4 and 5, the disc 28 has a radial slot 29 that receives the partition 20 within the chamber 27. The disc 28 has a spherical hub portion 30 also seen in FIG. 6, which slides and rotates in concave bearings 31, 32 formed in the upper and lower casing parts 12, 13.

Referring to FIG. 6, the lower casing part 13 forms a control cone 33 on an interior bottom of the housing 11 with an annular groove 34 around the control cone 33, and a spherical portion 30 of the disc 28 has an integrally formed spindle 35 that extends from the spherical portion 30 to a lower end of the spindle 35 contacting the control cone 33 and traveling around in the groove 34 around the control cone 33, and to an upper end traveling in a circle to rotate a crossbar unit 22. The inverted T-shaped crossbar unit 22 (seen best in FIG. 3) couples rotations of the upper end of the spindle 35 to rotations of the magnet assembly 15.

As further seen in FIG. 6, the upper and lower walls 25, 26 of the casing parts 12, 13 are disposed at an angle in the range from about 170 to about 230 to allow the disc member 15 to move up and down through a tilt angle of corresponding range as the tilted spindle 35 of the disc 28 travels in a circle around the control cone 33.

Referring again to FIG. 3, as incoming fluid is admitted through inlet 18, it enters the metering chamber 21 underneath the disc 28 and tends to lift the disc 28. This lifting action travels around in a circle and when it reaches the other side of the chamber 27 from the inlet 18, the portion of the disc 28 near the inlet 18 will tilt downward. This produces the well known nutating movement or wobble action as fluid passes through the chamber 27.

Figure 8:
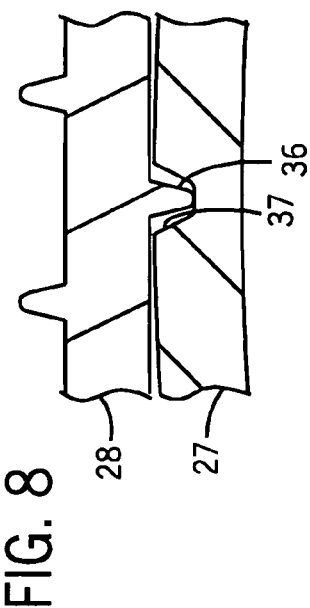
FIG. 8 is a detail section view taken in the plane indicated by line 8—8 in FIG. 7.
Figure 7:
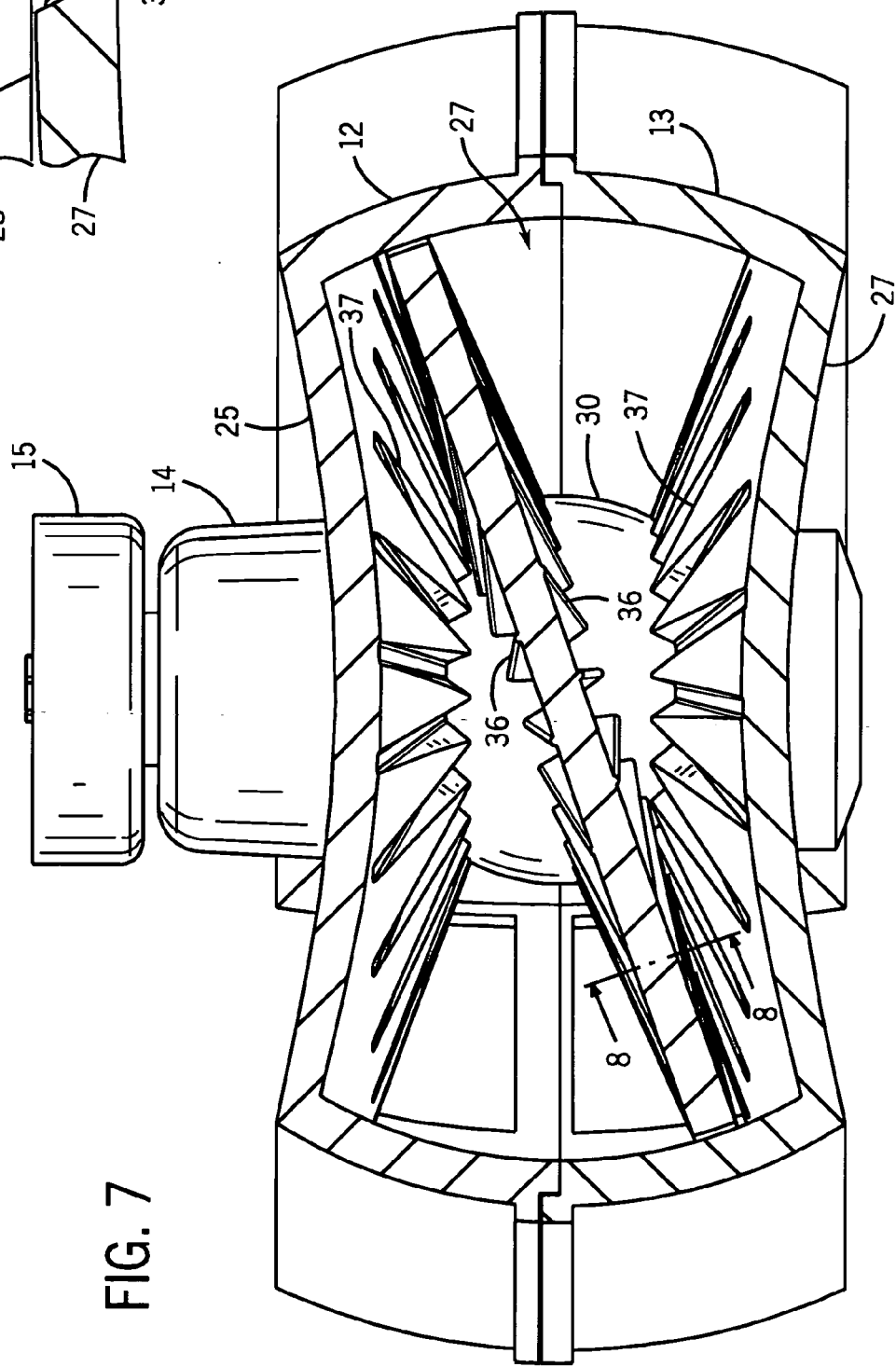
FIG. 7 is a sectional view taken in the plane indicated by line 7—7 in FIG. 2.

The disc 28 has raised, elongated ridges 36, while the casing 12, 13 form grooves 37 for receiving the ridges 36 on the nutating disc 28. As seen in FIGS. 7 and 8, the grooves 37 have tapering side walls from a wider opening to a narrower bottom, and the ridges 36 have tapered sides from a wider base to a narrower projecting extremity which facilitate the engagement of the ridges 36 in the grooves 37. As seen in FIG. 3, the disc 28 with its spherical portion 30, spindle 35 and ridges 36 is molded in one piece of a suitable resinous material. Similarly the casing parts 12, 13 are also molded parts, thus reducing the part count over prior constructions.

The geometrical layout of the ridges 36 and grooves 37 is seen in FIGS. 3, 4 and 5 where a first set of raised, elongated ridges 36 are formed on an upper surface of the disc. There are also a second set of raised, elongated ridges 36 formed on a lower surface of disc 28 at a corresponding positions to the first set. These ridges 36 are disposed on radii from a center of the disc 28, however, they could also be curved and disposed as spaced arcing ridges. A first set of elongated grooves 37 are formed on an interior surface of an upper casing wall 25 (FIG. 7) to receive the ridges 36 on the upper surface of the disc 28 and a second set of elongated grooves are formed on an interior surface of a lower casing wall 26 to receive the ridges 36 on the lower surface of the disc 28. On the lower casing part 13, these grooves 37 are also formed along radii from a center of the control cone 33 which corresponds to a geometrical center of the disc 28. On the upper casing part 12, they are formed along radii from a center of the axis of rotation of the magnetic element 15, which is aligned to the center of the disc 28 and the center of the control cone 33.

As the disc 28 moves in its wobbly motion in FIG. 7, first one projection 36 is engaged in a corresponding groove 37 and the succeeding projections 36 are engaged in corresponding grooves 37 around the interior of the metering chamber 27 from the inlet 18 to the outlet 19. With this traction, the disc 28 is capable of absorbing and counteracting the incoming pressure of the fluid which imposes lines on the spherical portion 30 and tends to rotate the spherical portion 30 and disc 28. The disc 28 absorbs these forces in a unique manner since it is actuated by the incoming fluid and eliminates the necessity for the utilization of the thrust roller bearing and slot arrangement normally found on the side of the measuring chamber which is directly opposite the partition 20.

As seen in FIGS. 7 and 8, the grooves 37 have tapering side walls from a wider opening to a narrower bottom, and the ridges 36 have tapered sides from a wider base to a narrower projecting extremity which facilitate the engagement of the ridges 36 in said grooves 37, with less friction, thereby reducing wear.

Figure 11:
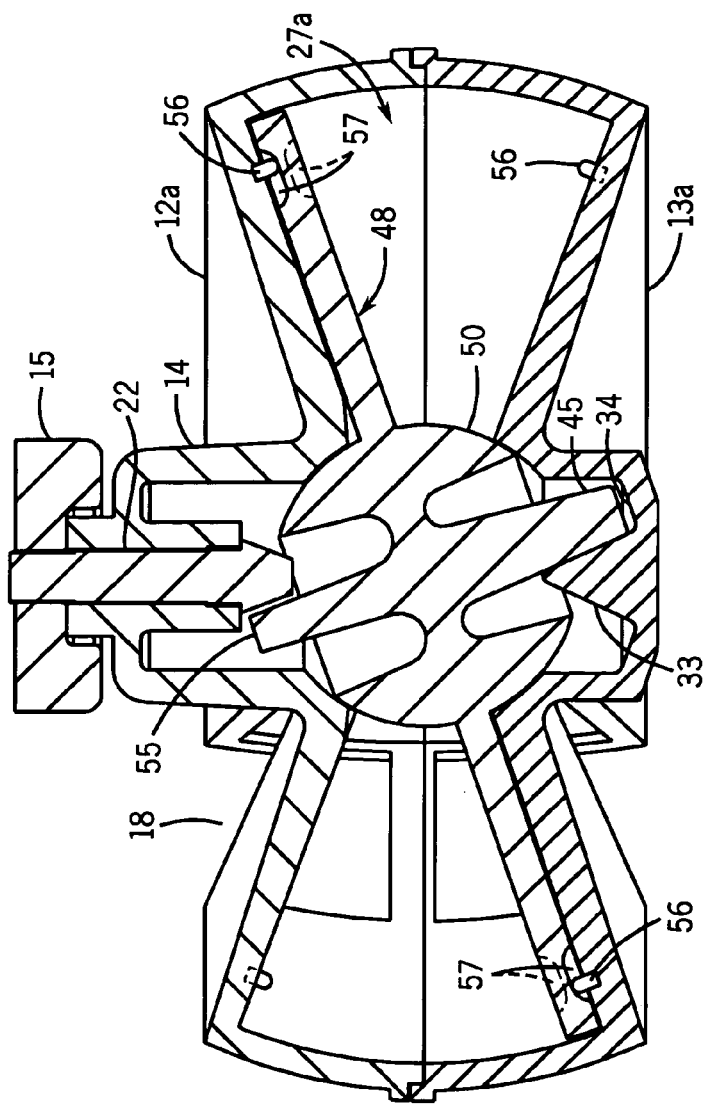
FIGS. 9–11 are views of a second embodiment, which correspond to the views in FIGS. 4, 5 and 6, respectively.
Figure 9:
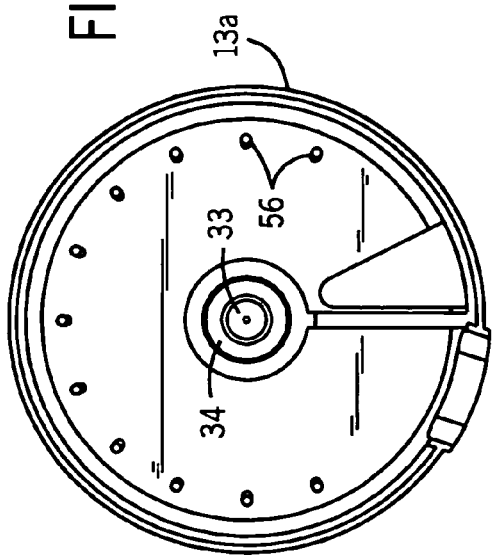
Figure 10:
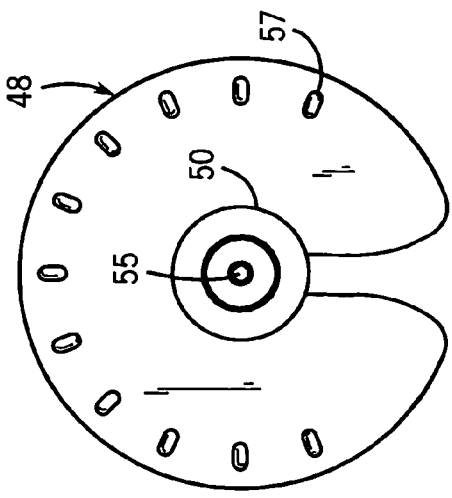

FIGS. 9, 10 and 11 illustrate a second embodiment in which the parts are similar to the parts in FIGS. 1–8, with the following exceptions. The casing parts 12a, 13a have blunt-ended rounded projections 56 with a cross sectional diameter of about 0.125 inches, while the disc 48 is molded with integrally formed oval niches 57 about 2.5 times in length compared to the diameter of the rounded projections and slightly wider. The projections 56 can be integrally formed or inserted in the casing walls. The niches 37 have rounding side walls from a wider opening to a narrower bottom, and the projections 56 have rounded tips which facilitate the engagement of the ridges 56 in the niches 57. The disc 48 with its spherical portion 50, spindle 45 and ridges 56 is molded in one piece of a suitable resinous material. Similarly the casing parts 12, 13 are also molded parts, thus reducing the part count over prior constructions.

The geometrical layout of the projections 56 and niches 57 is seen in FIGS. 9 and 10 where a first set of projections 56 is positioned on an interior surface of the transverse wall of the lower casing part 13a. There is also a second set of projections 56 positioned on an interior surface of the transverse wall on the upper casing part 12a as seen in FIG. 11. These projections 56 are disposed on radii from a center of the casing parts 12a, 13a. A first set of niches 57 is formed on an upper surface of the disc 48 to receive the projections 56 on the upper casing part 12a and a second set of niches 57 is formed on an upper surface of the disc 48 opposite the projections 56 to engage the projections 56 on the lower casing part 13a.

As the disc 48 moves in its wobbly motion, first one projection 56 is engaged in a corresponding niche 57 and the succeeding projections 56 are engaged in corresponding niches 57 around the interior of the metering chamber 27a from the inlet 18 to the outlet 19. With this traction, the disc 48 is capable of absorbing and counteracting the incoming pressure of the fluid which imposes both an axial thrust on the spherical portion 50 and tends to impose a side thrust to rotate the spherical portion 50 and disc 48. The disc 48 absorbs these forces in a unique manner since it is actuated by the incoming fluid and eliminates the necessity for the utilization of the thrust roller bearing and slot arrangement normally found on the side of the measuring chamber which is directly opposite the partition 20.

This has been a description of the preferred embodiments, but it will be apparent to those with skill in the art to which the invention pertains that various modifications may be made to these specific embodiments without departing from the spirit of the present invention, and that such modifications are intended to be encompassed by the following claims.

We claim:

1. A fluid meter comprising:
a casing providing a measuring chamber and having an inlet and outlet communicating with the measuring chamber;
a partition in said chamber separating said inlet from said outlet;
a disc positioned in said chamber and having a spherical portion supporting said disc for nutation, the disc having a slot for receiving the partition so as to prevent rotation of the disc;
wherein said casing is formed with at least one of depressions or projections which are spaced arcuately with respect to a center of a casing part; and
wherein said disc is formed with a complementary one of said projections or depressions disposed opposite the depressions or projections on the casing so as to engage the other one of the projections or depressions as the disc is nutated to counteract forces imposed on said disc by fluid flow.

2. The fluid meter of claim 1, wherein the projections are blunt-ended, round projections and wherein the depressions are oval niches for receiving the round project-ions on the disc.

3. The fluid meter of claim 1, wherein the projections are formed on the disc as raised, elongated ridges and wherein the depressions are formed on the casing as elongated grooves for receiving the ridges on the disc.

4. The fluid meter of claim 3, wherein said grooves have tapered side walls tapering from a wider opening to a narrower bottom, and wherein said ridges have tapered sides tapering from a wider base to a narrower projecting extremity which facilitate engagement of the ridges in said grooves.

5. The fluid meter of claim 3,
wherein a first plurality of raised, elongated ridges are formed on an upper surface of the disc and a second plurality of raised, elongated ridges are formed on a lower surface of disc; and
wherein said first plurality of elongated grooves are formed on an interior surface of an upper casing wall to receive the ridges on the upper surface of the disc and a second plurality of elongated grooves are formed on an interior surface of a lower casing wall to receive the ridges on the lower surface of the disc.

6. The fluid meter as claimed in claim 1, wherein said housing forms a control cone on an interior bottom of the housing with an annular groove around the control cone, and wherein the spherical portion of the disc forms an integral spindle that extends from the spherical portion to a lower end of the spindle contacting the control cone and traveling around in the groove around the control cone, and an upper end traveling in a circle to rotate a magnet assembly.

7. The fluid meter of claim 6, further comprising a annular magnetic member, and an inverted T-shaped part for coupling rotations of the upper end of the spindle to rotations of the magnetic member.

8. The fluid meter of claim 1, wherein the fluid meter does not include a thrust roller bearing that-moves up and down in a slot in an interior of the casing to counteract forces imposed on said disc by fluid flow.

* * * * *